(12) United States Patent
Kouda

(10) Patent No.: US 11,873,933 B2
(45) Date of Patent: Jan. 16, 2024

(54) PIPE COUPLING MEMBER

(71) Applicant: NITTO KOHKI CO., LTD., Tokyo (JP)

(72) Inventor: Toru Kouda, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 68 days.

(21) Appl. No.: 17/693,804

(22) Filed: Mar. 14, 2022

(65) Prior Publication Data

US 2022/0205571 A1    Jun. 30, 2022

Related U.S. Application Data

(63) Continuation of application No. PCT/JP2020/027871, filed on Jul. 17, 2020.

(30) Foreign Application Priority Data

Sep. 12, 2019 (JP) .................. 2019-166166

(51) Int. Cl.
  *F16L 37/23* (2006.01)
  *F16L 37/30* (2006.01)
(52) U.S. Cl.
  CPC .............. *F16L 37/23* (2013.01); *F16L 37/30* (2013.01)
(58) Field of Classification Search
  CPC . F16L 37/23; F16L 37/30; F16L 37/32; F16L 37/38; F16L 37/40; F16L 13/143; F16L 13/141
  See application file for complete search history.

(56) References Cited

U.S. PATENT DOCUMENTS 3,352,576 A * 11/1967 Thorne-Thomsen ....................... F16L 37/088
  285/321
5,553,899 A *  9/1996 Norkey ................... F16L 37/23
  285/316

(Continued)

FOREIGN PATENT DOCUMENTS

JP    S47043051    12/1972
JP    S52034646    8/1977

(Continued)

OTHER PUBLICATIONS

International Search Report for corresponding International Application PCT/JP2020/027871, dated Sep. 29, 2020.

(Continued)

*Primary Examiner* — David Bochna
(74) *Attorney, Agent, or Firm* — Burris Law, PLLC

(57) ABSTRACT

A pipe coupling member includes a coupling body defining a part of a fluid passage, and a support member disposed inside the coupling body. A valve accommodating space is defined inside the coupling body at a position forward of the support member, and a valve element is disposed in the valve accommodating space to open and close the fluid passage. The coupling body is formed from a thin-walled pipe material and has a deformed recess formed by plastically deforming radially inward a portion of the coupling body that covers an annular groove of the support member. The deformed recess has a locking element latching surface along a support surface of the annular groove. When the pipe coupling member is connected to an associated pipe coupling member, the locking element latching surface is latched by a locking element of the associated pipe coupling member.

8 Claims, 3 Drawing Sheets

(56) References Cited

U.S. PATENT DOCUMENTS

| | | | |
|---|---|---|---|
| 5,829,795 A * | 11/1998 | Riesselmann | F16L 13/141 |
| | | | 285/259 |
| 6,206,432 B1 * | 3/2001 | Kamiyama | F16L 37/23 |
| | | | 285/348 |
| 6,283,443 B1 | 9/2001 | Taneya | |
| 6,688,400 B2 | 2/2004 | Metcalfe et al. | |
| 10,415,734 B2 * | 9/2019 | Imoto | F16L 37/23 |
| 2002/0047266 A1 | 4/2002 | Naito | |
| 2005/0006896 A1 | 1/2005 | Naito et al. | |
| 2014/0044899 A1 * | 2/2014 | Golovashchenko | F16L 13/143 |
| | | | 428/34.1 |

FOREIGN PATENT DOCUMENTS

| | | |
|---|---|---|
| JP | S61206191 | 12/1986 |
| JP | H06080097 | 11/1994 |
| JP | 2000314411 | 11/2000 |
| JP | 2002130573 | 5/2002 |
| JP | 2005030532 | 2/2005 |
| JP | 2019019953 | 2/2019 |
| WO | 2017095692 | 6/2017 |

OTHER PUBLICATIONS

Extended European Search Report issued in corresponding EP Application 20862178.9, dated Jul. 14, 2023, 12 pages.

* cited by examiner

PIPE COUPLING MEMBER

CROSS-REFERENCE TO RELATED APPLICATIONS

This application is a continuation of International Application No. PCT/JP2020/027871, filed on Jul. 17, 2020, which claims priority to and the benefit of Japanese Patent Application No. 2019-166166, filed on Sep. 12, 2019. The disclosures of the above applications are incorporated herein by reference.

FIELD

The present disclosure relates to a pipe coupling member detachably connectable to an associated pipe coupling member having a locking element.

BACKGROUND

There are pipe couplings comprising a female pipe coupling member and a male pipe coupling member for allowing pipes to be rapidly coupled to and decoupled from each other. One type of such pipe coupling is configured such that a female pipe coupling member and a male pipe coupling member are detachably connected to each other by engaging a locking element of the female pipe coupling member with a locking element latching surface formed on the outer peripheral surface of the male pipe coupling member. For example, Japanese Patent Application Publication No. 2019-19953 discloses a pipe coupling including a female pipe coupling member and a male pipe coupling member each having a valve element that opens and closes a fluid passage, wherein when the two pipe coupling members are connected together, the valve elements of the pipe coupling members open their respective fluid passages. The male pipe coupling member has a cylindrical coupling body defining a fluid passage, and the coupling body has a circumferentially extending annular locking recess formed on the outer peripheral surface thereof. The locking recess is, specifically, defined by a bottom surface and two side surfaces inclinedly extending radially outward from the opposite sides, respectively, of the bottom surface. When the female pipe coupling member and the male pipe coupling member are connected to each other, the locking element of the female pipe coupling member engages the locking recess of the male pipe coupling member. In this connected state, the female pipe coupling member and the male pipe coupling member are subjected to forces in opposite directions away from each other by the urging forces of springs urging the valve elements and the pressure of the internal fluid. Consequently, the locking element is pressed against the inclined side surfaces of the locking recess with a relatively great force.

SUMMARY

The cylindrical coupling body defining a fluid passage in the above-described male pipe coupling member is usually manufactured by cutting process. The manufacturing process by cutting allows the coupling body to be formed as a single member having a valve seat portion, a locking recess, a pipe securing threaded portion, etc. and having sufficient rigidity to withstand the force applied from the locking element at the locking recess. However, the cutting process involves a relatively large amount of material wasted during cutting and requires an increased number of cutting steps in order to make a complex shape. Therefore, the manufacturing cost tends to increase. Regarding a pipe coupling member having a valve element, even when one component such as a valve element or a seal member attached to the valve element is damaged, it is usually difficult to replace only the damaged component, and it is unavoidably necessary to replace the whole pipe coupling member. Accordingly, it is expected to further reduce the manufacturing cost of the coupling body, whose cost ratio particularly tends to increase, thereby reducing the overall manufacturing cost of the pipe coupling member.

Under these circumstances, an object of the present disclosure is to provide a pipe coupling member capable of reducing the manufacturing cost as compared to conventional pipe coupling members.

That is, the present disclosure provides a pipe coupling member detachably connectable to an associated pipe coupling member having a locking element, the pipe coupling member including the following: a coupling body having a forward end and a rear end and cylindrically extending from the forward end to the rear end to define at least a part of a fluid passage of the pipe coupling member, the coupling body having a deformed portion deformed radially inward between the forward end and the rear end to form a locking element latching surface on an outer peripheral surface of the coupling body, the locking element latching surface facing rearward; and a cylindrical support member disposed inside the coupling body so as to support a part of the coupling body from radially inside, the support member having a support surface supporting from inside a portion of the deformed portion that forms the locking element latching surface. When the pipe coupling member is connected to the associated pipe coupling member, the locking element latching surface is latched by the locking element of the associated pipe coupling member, thereby allowing the pipe coupling member to be held by the associated pipe coupling member.

In the pipe coupling member, a coupling body defines at least a part of a fluid passage, and a portion of the coupling body where a locking element latching surface is formed is supported by a support surface of a support member disposed inside the coupling body. That is, the locking element latching surface, on which a relatively great force is applied, is supported by the support surface of the support member. Therefore, the coupling body itself does not need a high mechanical strength, and the whole coupling body can be formed into a thin-walled structure. Accordingly, it is possible to form the coupling body by plastically deforming a thin-walled pipe material and also possible to form the coupling body from by drawing a plate material. Processing using plastic deformation involves less waste of material than cutting process and can be performed even more simply, and it is therefore possible to manufacture the pipe coupling member at a lower cost than the conventional pipe coupling member having a coupling body manufactured by cutting process.

In addition, the arrangement may be as follows. The forward end of the coupling body is located forward of the support member. The coupling body defines a valve accommodating space inside thereof at a position forward of the support member, the valve accommodating space forming at least a part of the fluid passage. The pipe coupling member further includes a valve element disposed in the valve accommodating space, the valve element being slidable on an inner peripheral surface of the coupling body in the direction of a longitudinal axis of the coupling body to open and close the fluid passage.

In the above-described case, the arrangement may be as follows. The coupling body has a forward end portion curved radially inward at a position forward of the support member and extending to the forward end. The forward end portion is greater in thickness than the rest of the coupling body. The valve element sealingly engages with the forward end portion in the direction of the longitudinal axis to close the fluid passage.

In addition, the pipe coupling member may further include a spring disposed between the support member and the valve element to urge the valve element forward.

Disposing a spring for urging the valve element between the support member and the valve element eliminates the need to form a spring supporting portion on the coupling body, so that it becomes possible to make the coupling body in a simple form.

Further, the arrangement may be as follows. The support surface is inclined radially outward in the forward direction, and the locking element latching surface is inclined radially outward in the forward direction along the support surface.

With the above-described configuration, the portion of the coupling body where the locking element latching surface is formed can be planarly supported by the support surface of the support member, which makes it possible to prevent deformation of the locking element latching surface even more reliably.

In addition, the arrangement may be as follows. The support member has an annular groove formed on an outer peripheral surface thereof to extend in a circumferential direction. The support surface is a forward side surface of the annular groove. The deformed portion is a deformed recess deformed so as to be recessed radially inward along the annular groove to secure the support member to the coupling body.

The pipe coupling member may further include a seal member disposed in the annular groove to make contact with a rear side surface of the annular groove, the seal member being compressed between the annular groove of the support member and the deformed recess of the coupling body to seal between the support member and the coupling body.

With the above-described configuration, it is possible to seal between the support member and the coupling body even more reliably and hence possible to prevent a fluid in the fluid passage from leaking from between the support member and the coupling body even more reliably.

In addition, the support member may extend to the rear end of the coupling body and have a threaded portion on an inner peripheral surface thereof. The threaded portion is configured to be threadly engaged with a pipe member.

Embodiments of a pipe coupling member according to the present disclosure will be explained below on the basis of the accompanying drawings.

DRAWINGS

DETAILED DESCRIPTION

Figure 1:
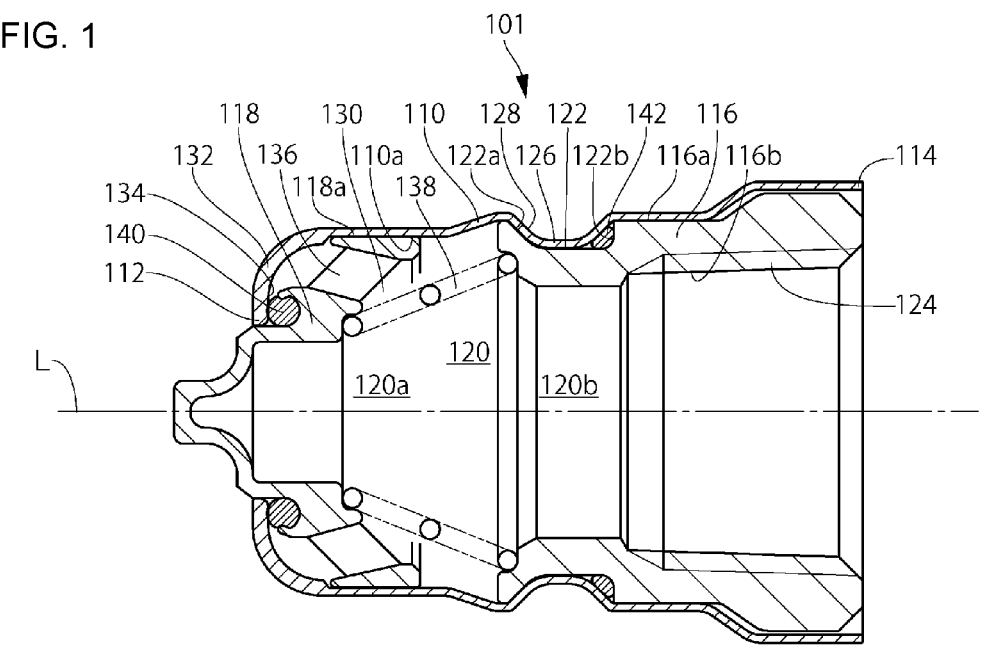
FIG. 1 is a sectional view of a pipe coupling member according to a first embodiment of the present disclosure.

A pipe coupling member 101 according to a first embodiment of the present disclosure includes, as shown in FIG. 1, a coupling body 110 cylindrically extending from a forward end 112 to a rear end 114, a cylindrical support member 116 disposed inside the coupling body 110, and a valve element 118 disposed inside the coupling body 110 forward of the support member 116. The pipe coupling member 101 has a fluid passage 120 having a forward portion 120a (leftward portion as seen in the figure) defined by the coupling body 110 and a rear portion 120b (rightward portion as seen in the figure) defined by the support member 116.

The support member 116 has an annular groove 122 formed on an outer peripheral surface 116a thereof. The annular groove 122 is formed to extend in the circumferential direction of the support member 116. The annular groove 122 has a forward side surface 122a serving as a support surface 122a which is inclined radially outward in the forward direction. The support member 116 extends to the rear end 114 of the coupling body 110 and has a threaded portion 124 formed on an inner peripheral surface 116b thereof. The threaded portion 124 is to be fitted with a pipe member by threaded engagement.

The coupling body 110 has a deformed recess 126 (deformed portion) that is formed by plastically deforming the coupling body 110 radially inward along the annular groove 122 of the support member 116. The deformed recess 126 forms a locking element latching surface 128 that is inclined radially outward in the forward direction along the support surface 122a of the annular groove 122. A portion of the coupling body 110 where the locking element latching surface 128 is formed is supported from radially inside by the support surface 122a of the support member 116. The forward end 112 of the coupling body 110 is located forward of the support member 116, and the coupling body 110 defines a valve accommodating space 130 inside the coupling body 110 at a position forward of the support member 116. It should be noted that the valve accommodating space 130 also serves as a part of the fluid passage 120. The coupling body 110 further has a forward end portion 132 that is curved radially inward at a position forward of the support member 116 and extends to the forward end 112. The forward end portion 132 is made greater in thickness than the rest of the coupling body 110 to constitute a valve seat surface 134 with which the valve element 118 is sealingly engageable, as will be described later.

The valve element 118 is disposed in the valve accommodating space 130 of the coupling body 110. The valve element 118 has an outer peripheral surface 118a that is slidable on an inner peripheral surface 110a of the coupling body 110 in the direction of a longitudinal axis L of the coupling body 110 to open and close the fluid passage 120. In addition, the valve element 118 has a plurality of through-passages 136 extending therethrough in the direction of the longitudinal axis L to pass the internal fluid therethrough. A conically wound spring 138 is disposed between the valve element 118 and the support member 116, and the valve element 118 is urged forward by the urging force of the spring 138. The valve element 118 has an annular seal member 140 attached thereto. The valve element 118 urged forward by the urging force of the spring 138 sealingly engages in the direction of the longitudinal axis L with the valve seat surface 134 of the forward end portion 132 of the coupling body 110 through the seal member 140 to close the fluid passage 120.

Figure 2:
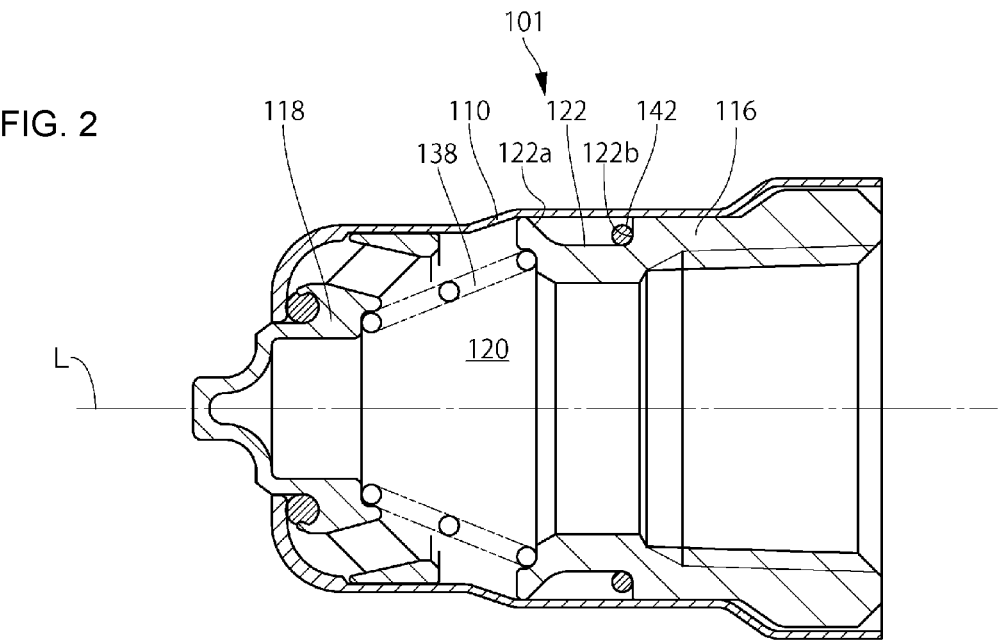
FIG. 2 is a sectional view showing the pipe coupling member of FIG. 1 in a state before a deformed recess is formed therein.

The coupling body 110 is a member made by drawing a plate material or plastically deforming a thin-walled pipe material. The coupling body 110 is temporarily formed in a shape shown in FIG. 2. Thereafter, the valve element 118, the spring 138, and the support member 116 are inserted in order into the coupling body 110 to obtain the state shown in FIG. 2, and a portion of the coupling body 110 that covers the annular groove 122 of the support member 116 is plastically deformed radially inward to form the deformed recess 126. In this way, the coupling body 110 is formed into the shape shown in FIG. 1. A seal member 142 is disposed in the annular groove 122 to make contact with a rear side surface 122b of the annular groove 122. When the deformed recess 126 is formed, the seal member 142 is compressed between the annular groove 122 and the deformed recess 126 to seal between the support member 116 and the coupling body 110. Thus, the internal fluid flowing through the fluid passage 120 is prevented from leaking to the outside of the pipe coupling member 101 from between the coupling body 110 and the support member 116. In addition, by forming the deformed recess 126 so as to be recessed radially inward along the annular groove 122, the support member 116 is secured to the coupling body 110.

Figure 3:
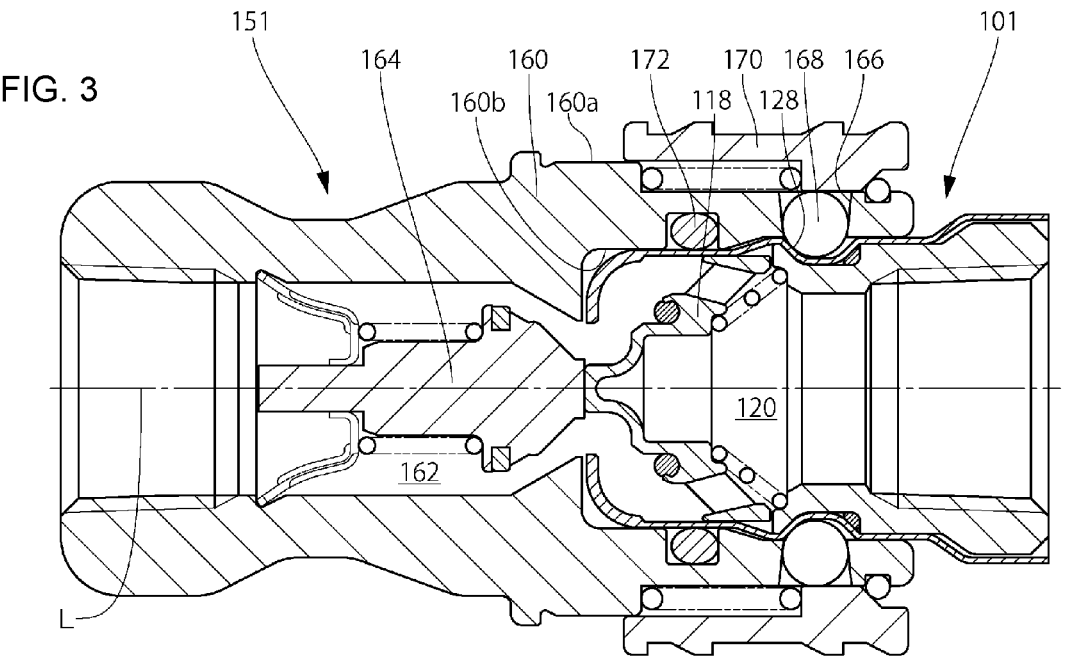
FIG. 3 is a sectional view showing the pipe coupling member of FIG. 1 in a state of being connected to an associated pipe coupling member.

The pipe coupling member 101 is connectable to an associated pipe coupling member 151. As shown in FIG. 3, the associated pipe coupling member 151 includes a cylindrical coupling body 160 defining a fluid passage 162, a valve element 164 disposed in the coupling body 160, a plurality of spherical locking elements 168 radially displaceably disposed in locking element retaining holes 166, respectively, of the coupling body 160, and a sleeve 170 disposed so as to be displaceable on an outer peripheral surface 160a of the coupling body 160 in the direction of the longitudinal axis L. In addition, an annular seal member 172 is attached to an inner peripheral surface 160b of the coupling body 160. When the pipe coupling member 101 is inserted into the fluid passage 162 of the associated pipe coupling member 151, the locking elements 168 are held from radially outside by the sleeve 170 in a state of abutting against the locking element latching surface 128. Consequently, the locking element latching surface 128 of the pipe coupling member 101 is latched by the locking elements 168 of the associated pipe coupling member 151, and thus the pipe coupling member 101 is held by the associated pipe coupling member 151. In this connected state, the valve element 118 of the pipe coupling member 101 and the valve element 164 of the associated pipe coupling member 151 abut against each other to reach an open position for opening their respective fluid passages 120 and 162. In addition, the seal member 172 provides sealing engagement between the coupling body 110 of the pipe coupling member 101 and the coupling body 160 of the associated pipe coupling member 151, thus allowing communication between the fluid passage 120 of the pipe coupling member 101 and the fluid passage 162 of the associated pipe coupling member 151.

Figure 4:
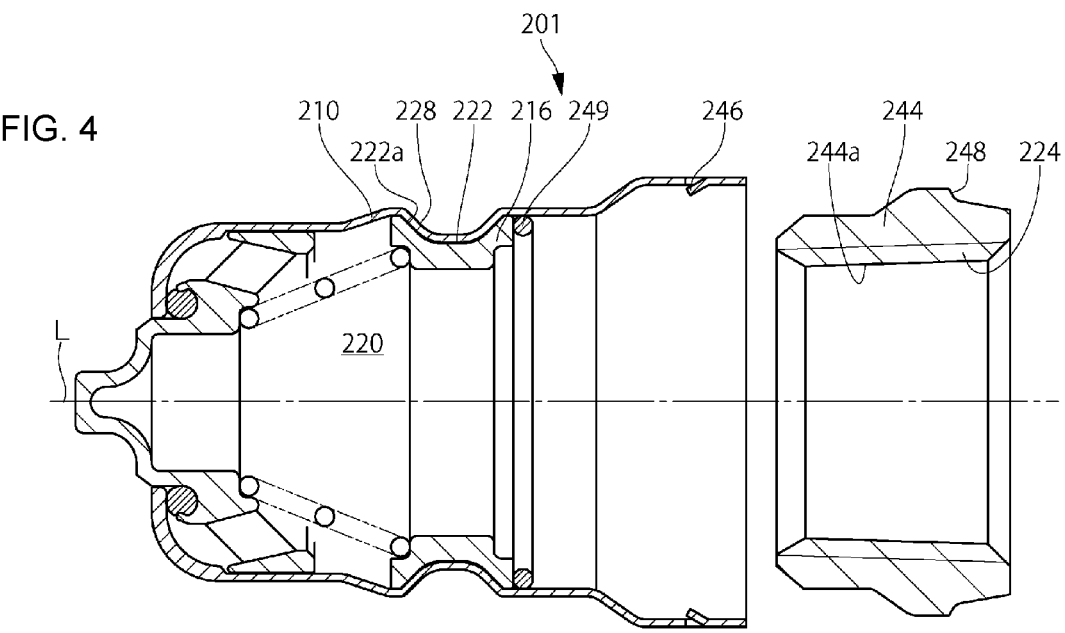
FIG. 4 is a sectional view of a pipe coupling member according to a second embodiment of the present disclosure.
Figure 5:
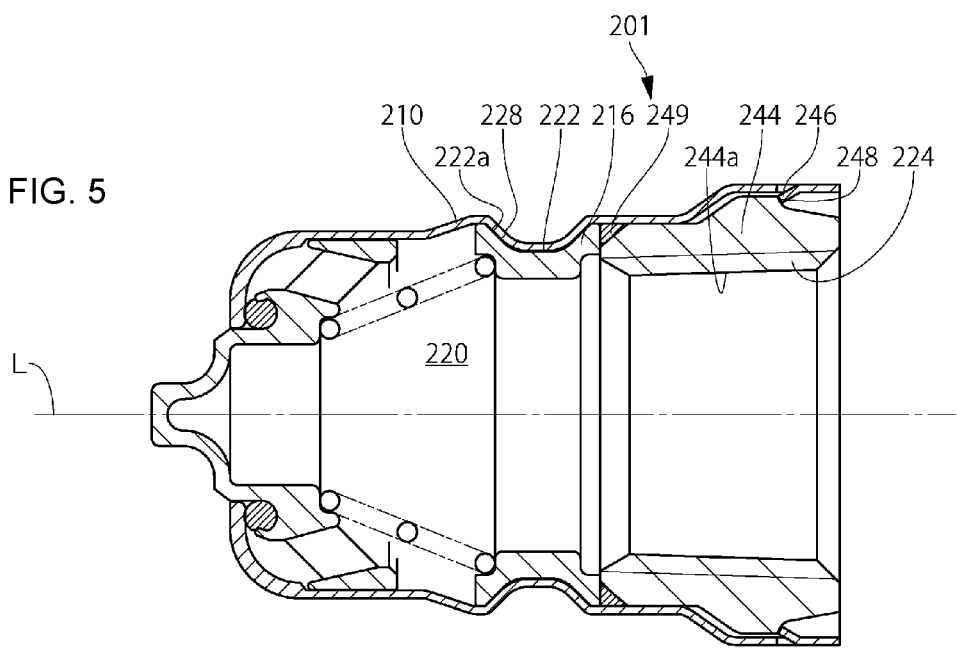
FIG. 5 is a sectional view showing the pipe coupling member of FIG. 4 in a state where an adapter has been connected thereto.

FIGS. 4 and 5 show a pipe coupling member 201 according to a second embodiment of the present disclosure. In the pipe coupling member 201, a support member 216 has a width only slightly greater than that of an annular groove 222, and the length of the support member 216 in the direction of the longitudinal axis L is shorter than that of the support member 116 in the first embodiment. In addition, an adapter 244 is inserted and secured rearward of the support member 216 inside a coupling body 210. The adapter 244 has a threaded portion 224 formed on an inner peripheral surface 244a thereof to enable a pipe member to be attached thereto by thread engagement. The adapter 244 is secured to the coupling body 210, as shown in FIG. 5, by engaging a latching projection 246 formed on the coupling body 210 with a latching portion 248 of the adapter 244. When the adapter 244 is to be secured to the coupling body 210, a seal member 249 is installed rearward of the support member 216 in advance, and the adapter 244 is inserted into the coupling body 210 from the rear. When the adapter 244 is inserted and secured, the seal member 249 is compressed between the coupling body 210, the support member 216, and the adapter 244, thereby sealing between these members. Thus, the internal fluid flowing through a fluid passage 220 is prevented from leaking to the outside of the pipe coupling member 201. It should be noted that the adapter 244 can be detached from the coupling body 210 by displacing the latching projection 246 of the coupling body 210 radially outward.

In the pipe coupling member 101, 201, a portion of the coupling body 110, 210 where the locking element latching surface 128, 228 is formed is subjected to a great force applied radially inward from the locking elements 168 when the pipe coupling member 101, 201 is connected to the associated pipe coupling member 151. According to the present disclosure, the above-described portion of the coupling body 110, 210 is supported from inside by the support surface 122a, 222a of the support member 116, 216. Therefore, the coupling body 110, 210 itself does not need a high mechanical strength, and the whole coupling body 110, 210 can be formed into a thin-walled structure. Accordingly, the coupling body 110, 210 can be formed by deforming a pipe material and also can be formed by drawing a plate material. In other words, unlike the conventional pipe coupling member, no cutting process is required to manufacture the coupling body; therefore, the pipe coupling member 101, 201 can be manufactured at a lower cost than the conventional pipe coupling member.

Although some embodiments of the present disclosure have been explained above, the present disclosure is not limited to these embodiments. For example, the foregoing embodiments have a configuration including a valve element, but the present disclosure may be configured to include no valve element. In addition, the support surface of the support member and the locking element latching surface of the coupling body are only required to be surfaces facing rearward. For example, the support surface and the locking element latching surface may be surfaces that are perpendicular to the longitudinal axis. Further, the coupling body and the support member may be sealingly engaged with each other directly by metal-to-metal sealing instead of sealing through a seal member between the coupling body and the support member.

What is claimed is:

1. A pipe coupling member detachably connectable to an associated pipe coupling member having a locking element, the pipe coupling member comprising:
    a coupling body having a forward end and a rear end and cylindrically extending from the forward end to the rear end to define at least a part of a fluid passage of the pipe coupling member, the coupling body having a deformed portion deformed radially inward between the forward end and the rear end to form a locking element latching surface on an outer peripheral surface of the coupling body, the locking element latching surface facing rearward; and a cylindrical support member disposed inside the coupling body so as to support a part of the coupling body from radially inside, the support member having a support surface supporting from inside a portion of the deformed portion that forms the locking element latching surface;

wherein when the pipe coupling member is connected to the associated pipe coupling member, the locking element latching surface is latched by the locking element of the associated pipe coupling member, thereby allowing the pipe coupling member to be held by the associated pipe coupling member.

2. The pipe coupling member of claim 1, wherein the forward end of the coupling body is located forward of the support member, the coupling body defining a valve accommodating space inside thereof at a position forward of the support member, the valve accommodating space forming at least a part of the fluid passage;

wherein the pipe coupling member further comprises a valve element disposed in the valve accommodating space, the valve element being slidable on an inner peripheral surface of the coupling body in a direction of a longitudinal axis of the coupling body to open and close the fluid passage.

3. The pipe coupling member of claim 2, wherein the coupling body has a forward end portion curved radially inward at a position forward of the support member and extending to the forward end, the forward end portion being greater in thickness than rest of the coupling body, wherein the valve element sealingly engages with the forward end portion in the direction of the longitudinal axis to close the fluid passage.

4. The pipe coupling member of claim 2, further comprising a spring disposed between the support member and the valve element to urge the valve element forward.

5. The pipe coupling member of claim 1, wherein the support surface is inclined radially outward in a forward direction, and the locking element latching surface is inclined radially outward in the forward direction along the support surface.

6. The pipe coupling member of claim 1, wherein the support member has an annular groove formed on an outer peripheral surface thereof to extend in a circumferential direction, and the support surface is a forward side surface of the annular groove, and wherein the deformed portion is a deformed recess deformed so as to be recessed radially inward along the annular groove to secure the support member to the coupling body.

7. The pipe coupling member of claim 6, further comprising a seal member disposed in the annular groove to make contact with a rear side surface of the annular groove, the seal member being compressed between the annular groove of the support member and the deformed recess of the coupling body to seal between the support member and the coupling body.

8. The pipe coupling member of claim 1, wherein the support member extends to the rear end of the coupling body and has a threaded portion on an inner peripheral surface thereof, the threaded portion configured to be threadly engaged with a pipe member.

* * * * *